(12) United States Patent
Kohl et al.

(10) Patent No.: US 12,116,505 B2
(45) Date of Patent: *Oct. 15, 2024

(54) TRANSIENT ADHESIVES, METHODS OF MAKING, AND METHODS OF USE

(71) Applicant: Georgia Tech Research Corporation, Atlanta, GA (US)

(72) Inventors: Paul A. Kohl, Atlanta, GA (US); Anthony Engler, Atlanta, GA (US); Jared Schwartz, Atlanta, GA (US); Gerald Gourdin, Atlanta, GA (US); Jisu Jiang, Atlanta, GA (US); Oluwadamilola Phillips, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 500 days.

This patent is subject to a terminal disclaimer.

(21) Appl. No.: 17/405,139

(22) Filed: Aug. 18, 2021

(65) Prior Publication Data
US 2021/0380854 A1    Dec. 9, 2021

Related U.S. Application Data

(62) Division of application No. 16/540,550, filed on Aug. 14, 2019, now Pat. No. 11,149,174, which is a division of application No. 15/494,949, filed on Apr. 24, 2017, now Pat. No. 10,479,915.

(60) Provisional application No. 62/326,341, filed on Apr. 22, 2016.

(51) Int. Cl.
| C09J 163/00 | (2006.01) |
| B32B 7/06 | (2019.01) |
| B32B 7/12 | (2006.01) |
| C09J 169/00 | (2006.01) |
| C09J 171/00 | (2006.01) |

(52) U.S. Cl.
CPC .............. *C09J 163/00* (2013.01); *B32B 7/06* (2013.01); *B32B 7/12* (2013.01); *C09J 169/00* (2013.01); *C09J 171/00* (2013.01); *B32B 2255/26* (2013.01); *B32B 2307/748* (2013.01); *B32B 2437/00* (2013.01); *B32B 2457/00* (2013.01)

(58) Field of Classification Search
CPC .......... B32B 2255/26; B32B 2307/748; B32B 2437/00; B32B 2457/00; B32B 7/06; B32B 7/12; C09J 163/00; C09J 169/00; C09J 171/00
See application file for complete search history.

(56) References Cited

U.S. PATENT DOCUMENTS

| 3,067,174 | A | 12/1962 | Sullivan |
| 4,070,415 | A | 1/1978 | Sextro et al. |
| 10,479,915 | B2 * | 11/2019 | Kohl ................ C09J 169/00 |
| 11,149,174 | B2 * | 10/2021 | Kohl ................ B32B 7/12 |
| 2008/0311396 | A1 | 12/2008 | Hamada et al. |
| 2014/0072806 | A1 | 3/2014 | Allen et al. |

FOREIGN PATENT DOCUMENTS

WO    2012154849 A1    11/2012

OTHER PUBLICATIONS

Montaudo, G., et al.; Polymer Degradation and Stability, 1989, vol. 26, p. 285-304.
Khosravi, E., et al.; European Polymer Journal, 2011, vol. 47, p. 465-473.
Phillips O. Schwartz JM, Kohl PA Thermal decomposition of poly(propylene carbonate): End-Capping, additives, and solvent effects. Polymer Degradation and Stability, 12 (2016) pp. 129-139.
Schwartz JM Phillips O., Engler A. Sutlief A, Lee Jihyun, Kohl PA. Stable, High-Molecular-Weight Poly (phthalaldehyde), Journal of Polymer Science, Part A: Polymer Chemistry 2016, 55, 1166-1172.
Katz, Joshua Andrew, "Synthesis and Applications of Depolymerizable Polyaldehydes," 2015, p. i-150.
Dilaurio, Anthony M., et al., "End-capped poly(4,5-dichlorophthalaldehyde): a stable self-immolative poly (aldehyde) for translating specific inputs into amplified outputs, both in solution and solid state," Polymer Chemistry, 2015, vol. 6, pp. 3252-3258.
Botteghi, C., et al., "Synthesis of $\alpha,\omega$-epoxyaldehydes by hydroformylation of $\alpha,\omega$-epoxyalkenes," Journal of Molecular Catalysis A: Chemical, 2002, vol. 179, pp. 79-86.

* cited by examiner

*Primary Examiner* — Lynda Salvatore
(74) *Attorney, Agent, or Firm* — Thomas | Horstemeyer, LLP

(57) ABSTRACT

Embodiments of the present disclosure provide for transient adhesive polymers, methods of making transient adhesive polymers, structures including the transient adhesive polymer attaching two portions of the structure to one another, and the like.

19 Claims, No Drawings

TRANSIENT ADHESIVES, METHODS OF MAKING, AND METHODS OF USE

CROSS-REFERENCE TO RELATED APPLICATIONS

This application is a divisional application which claims priority to, and the benefit of, U.S. application Ser. No. 16/540,550, filed Aug. 14, 2019, which is a Divisional Application of U.S. application Ser. No. 15/494,949, filed Apr. 24, 2017, now U.S. Pat. No. 10,479,915, issued Nov. 19, 2019, which claims the benefit of and priority to U.S. Provisional Application entitled "POLYFORMALS FOR USE AS A TRANSIENT, CONDUCTIVE OR NON-CONDUCTIVE ADHESIVE," filed on Apr. 22, 2016, and assigned application No. 62/326,341, all of which are hereby incorporated by reference in there entireties.

STATEMENT REGARDING FEDERALLY SPONSORED RESEARCH OR DEVELOPMENT

This invention was made with government support under W31P4Q-14-C-0118 awarded by the Defense Advanced Research Project Agency. The government has certain rights in the invention.

BACKGROUND

Small electronic devices, such as sensors, are increasingly used in daily life. For example, electronic devices can be used to monitor pressure, temperature, linear acceleration and angular acceleration in automobiles, industrial manufacturing equipment, or in wearable devices. Military personnel use sensors to monitor their own troops or to spy on others. Sensors can detect sound, movement or the presence of large ferro-magnetic objects.

A growing problem with the ubiquitous deployment of sensors is their presence after they have completed their mission. In civilian applications, the sensors occupy space in land-fills or become unwanted litter. In military applications, the sensor can fall into enemy hands and can be reverse-engineered. Knowledge of even the presence of a sensor can give an enemy valuable information about the presence and intention of a future military mission.

Beyond electronic devices, such as sensors, materials which decompose at a particular time, whether triggered by an external stimulus, natural stimulus, or simply a timed-reaction, are of interest. Packages, packing materials, enclosures, wearable clothing, parachutes and other items may be made from such decomposing materials. Decomposition of the items eliminates the cost of retrieval and disposal, and eliminates the risk of an adversary discovering one's intentions or location. For example, parachutes are bulky to recover after use and at times, their detection is undesirable. Simply the presence of the spent polymer item may take up space and the component is no longer needed or wanted.

SUMMARY

Embodiments of the present disclosure provide for transient adhesive polymers, methods of making transient adhesive polymers, structures including the transient adhesive polymer attaching two portions of the structure to one another, and the like.

In an aspect, a composition of the present disclosure, among others, includes: a transient polymer adhesive that loses its adhesive properties upon exposure to temperatures from about 0 to about 325° C. The transient polymer adhesive can be a thermoplastic or thermoset polymer.

In an aspect, the thermoplastic can be represented by the following structure:

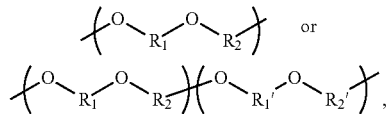

wherein $R_1$ and $R_{1'}$ are each independently selected from $C_xX_y$, linear or branched, where X is H or a halogen and x is 1 to 12 and y is x to 2x, and wherein $R_2$ and $R_{2'}$ are each independently selected from an unsaturated cycloalkyl, wherein $R_1$ and $R_{1'}$ are the same or different and wherein $R_2$ and $R_{2'}$ are the same or different. In an aspect, the thermoset polymer can have one of the following structures: wherein the thermoset polymer has one of the following structures:

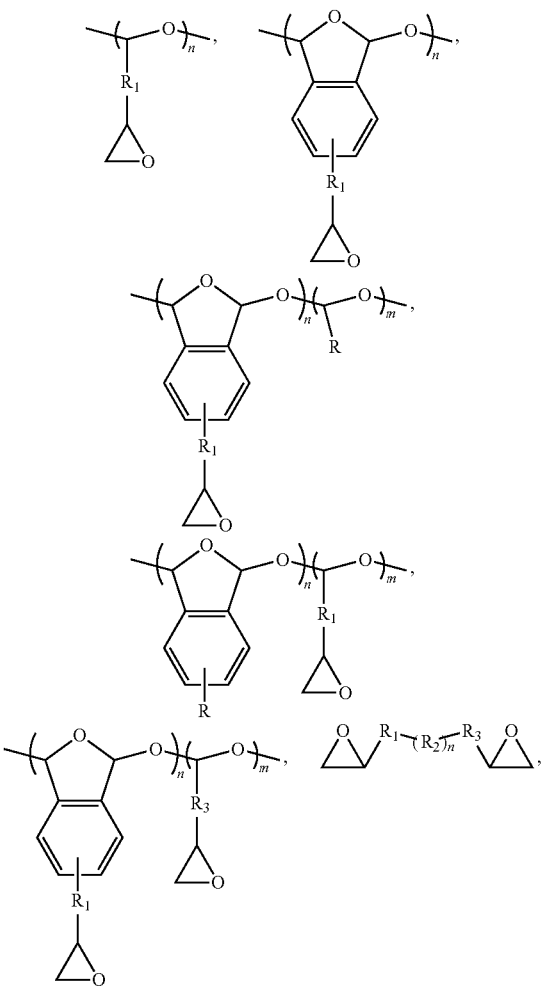

wherein $R_2$ is a decomposable polymer, wherein $R_1$ and $R_3$ are each independently selected from $C_xX_y$, linear or branched, where X is H or a halogen and x is 1 to 12 and y is x to 2xy, a bivalent aryl group, a bivalent ether, a bivalent ketone, a bivalent carbonate, a bivalent amine, a bivalent amide, or a bivalent thiol, wherein R is a alkyl group, an aryl group, an ether group, a ketone group, a carbonate group, an amine group, an amide group, or a thiol group, wherein n is 2 to 100,000 and m is 2 to 100,000.

In an aspect, a structure of the present disclosure, among others, includes: a device or a textile adhered to a substrate using a transient polymer adhesive that loses its adhesive properties upon exposure to temperatures from about 0 to about 325° C.

Other compositions, methods, features, and advantages will be or become apparent to one with skill in the art upon examination of the following drawings and detailed description. It is intended that all such additional compositions, methods, features and advantages be included within this description, be within the scope of the present disclosure, and be protected by the accompanying claims.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of electrochemistry, analytical chemistry, polymer chemistry, material science, and the like, which are within the skill of the art. Such techniques are explained fully in the literature.

Prior to describing the various embodiments, the following definitions are provided and should be used unless otherwise indicated.

Unless otherwise defined, all technical and scientific terms used herein have the same meaning as commonly understood by one of ordinary skill in the art of microbiology, molecular biology, medicinal chemistry, and/or organic chemistry. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions

The term "substituted" refers to any one or more hydrogens on the designated atom that can be replaced with a selection from the indicated group, provided that the designated atom's normal valence is not exceeded, and that the substitution results in a stable compound.

As used herein, "alkyl" or "alkyl group" refers to a saturated aliphatic hydrocarbon which can be straight or branched and/or substituted or unsubstituted, having 1 to 20 carbon atoms, wherein the stated range of carbon atoms includes each intervening integer individually, as well as sub-ranges. An alkyl group can be monovalent (e.g., —$CH_3$) or bivalent (e.g., —$CH_2$—$CH_2$—) depending upon the specific structure or formula which it is used. A bivalent group is one which has two carbon-carbon sigma bonds, such as a —$CH_2$— or methylene group (i.e., bivalent alkyl group), as compared to a terminal —$CH_3$ (methyl) alkyl group which has only one carbon-carbon sigma bond. Examples of alkyl include, but are not limited to methyl, ethyl, n-propyl, iso-propyl, n-butyl, sec-butyl, tert-butyl, n-pentyl, and sec-pentyl, and the like.

The term "cycloalkyl" refers to a non-aromatic mono- or multicyclic ring system of about 3 to about 10 carbon atoms, preferably of about 5 to about 10 carbon atoms, where the cycloalkyl can be saturated or unsaturated (monovalent (—R) or bivalent (—R—)). In a particular embodiment, the cycloalkyl is unsaturated. Preferred ring sizes of rings of the ring system include about 5 to about 6 ring atoms. Unless stated otherwise, "cycloalkyl" includes substituted and unsubstituted cycloalkyls. Exemplary monocyclic cycloalkyl include cyclopentyl, cyclohexyl, cycloheptyl, and the like. Exemplary multicyclic cycloalkyl include 1-decalin, norbornyl, adamant-(1- or 2-)yl, and the like.

The term "aryl" as used herein, refers to an aromatic monocyclic or multicyclic ring system (fused rings). Unless stated otherwise, "aryl" includes substituted and unsubstituted aryls (monovalent (—R) or bivalent (—R—)). Exemplary aryl groups include phenyl or naphthyl, or phenyl substituted or naphthyl substituted.

As used herein, "halo", "halogen", or "halogen radical" refers to a fluorine, chlorine, bromine, and iodine, and radicals thereof. Further, when used in compound words, such as "haloalkyl" or "haloalkenyl", "halo" refers to an alkyl or alkenyl radical in which one or more hydrogens are substituted by halogen radicals. Examples of haloalkyl include, but are not limited to, trifluoromethyl, trichloromethyl, pentafluoroethyl, and pentachloroethyl.

Transient adhesive or transient polymer adhesive is a polymeric material which initially possesses adhesive properties and can be used to join components together. The adhesive can be of the sticky or tacky variety which joins components by means of physical adhesion forces. An adhesive can also form chemical bonds, such as covalent bonds which provide chemical adhesion. The transient adhesive can be triggered so as to transform it into smaller molecular weight, non-adhesive products (e.g., carbon dioxide, water, or hydrocarbons). The low molecular weight products can either be in the gaseous, liquid or solid state depending on the temperature and chemical structure of the products. After transformation, the solid can melt and the liquid can evaporate (e.g., hydrocarbon). The transformation of the polymer adhesive directly into a gas (e.g., carbon dioxide) would result in immediate vaporization of the adhesive. The triggering event can be a thermal heating, chemical attack, chemical catalyst (i.e. trigger material is regenerated after each trigger event), photo-activated event, acoustic-activated event, radiation-activated event, or other stimulus which transforms the polymer adhesive.

The transformation of the transient polymer adhesive will have an onset temperature for the event, $T_{Donset}$. If the temperature were ramped from below $T_{Donset}$ to values above $T_{Donset}$, such as in a thermal experiment, the temperature at the onset of the polymer transition would be identified as $T_{Donset}$. $T_{Donset(cat)}$ means the transformation temperature when a catalyst participates in the reaction. A person of ordinary skill in the art would recognize that $T_{Donset}$ is not a single temperature value but rather a range of values because it could change slightly depending on the ramp rate or time spent any particular temperature.

DISCUSSION

Embodiments of the present disclosure provide for transient adhesive polymers, methods of making transient adhesive polymers, structures including the transient adhesive polymer attaching two portions of the structure to one another, and the like.

As described herein, there is a need for transient polymer adhesives to be used in attaching (e.g., adhering) components in a structure. Embodiments of the present disclosure provide for transient adhesive polymers that transform from a solid to a vapor at a particular time or when triggered. In this regard, embodiments of the present disclosure are advantageous in that use of the transient adhesive polymer mitigates the risk of detection (e.g., in military or covert actions) and lower the cost of disposal of devices such as electronic components (e.g., sensors) or non-electronic items (e.g., parachutes).

Embodiments of the present disclosure provide for transient polymer adhesives that can serve as adhesives in devices and textile, where the transient polymer adhesives lose their adhesive properties upon exposure to temperatures from about 0 to about 325° C. The temperatures can be achieved by acoustic, electrical, optical, thermal and/or chemical effects and can be triggered through acoustic, electrical, optical, thermal and/or chemical events. The transient polymer adhesive transforms into volatile, small molecules (e.g., monomers and the like) when triggered. The resulting small molecules can be a vapor at ambient temperature (i.e., have boiling point below ambient temperature), can be a liquid at ambient temperature (such as to be used with poly(phthalaldehyde)), or can vaporize at temperatures above ambient temperature (such as to be used with polycarbonates). The resulting transformation of the adhesive into a liquid (below, at or above room temperature) would allow evaporation within an acceptable time for the particular application (e.g., hours to days).

Embodiments of the present disclosure include transient polymer adhesives, where upon exposure to temperatures of about 0 to about 325° C., about 80 to about 325° C., or about 25 to about 200° C., the transient polymer adhesive loses (e.g., about 70 to 100%, about 80 to 100%, about 90 to 100%, or about 95 to 100%) its adhesive properties upon activation of a trigger after a time frame (e.g., minutes to hours to days), depending upon the specific formulation and the desired outcome. The term "adhesive" refers to a material used to attach structures together for period of time under certain conditions ranging from a weak interaction (comes apart with less force) to a very strong interaction (comes apart with more force) depending upon the specific formulation. In an embodiment, the transient polymer adhesives can be a transient thermoplastic polymer adhesive or a transient thermoset polymer adhesive.

In an embodiment, the transient thermoplastic polymer adhesive can be represented by the following structures:

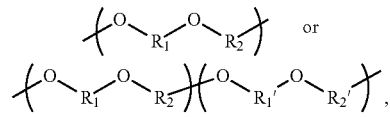

where about 2 to 100,000 monomer units can be used to form the transient thermoplastic polymer adhesive. In an aspect, $R_1$ and $R_{1'}$ are each independently selected from $C_xX_y$, linear or branched, where X is H or a halogen and x is 1 to 12 and y is x to 2x. In an embodiment, $R_2$ and $R_{2'}$ are each independently selected from an unsaturated cycloalkyl. In an embodiment, $R_2$ and $R_{2'}$ are each independently selected from selected from

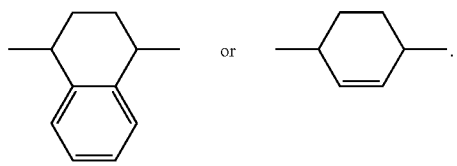

$R_1$ and $R_{1'}$ can be the same or different and $R_2$ and $R_{2'}$ can be the same or different.

In an embodiment, the transient thermoplastic polymer adhesive can be synthesized through step-growth polymerization mechanisms. In an embodiment, the transient thermoplastic polymer adhesive can have a $T_g$ of about 10 to 80° C. In an aspect, the $T_g$ of the chemical composition of the transient thermoplastic polymer adhesive can be tuned to suit the application where the components to be attached are heated to just above polymer $T_g$ where bonding occurs and then the components are cooled to a temperature below $T_g$. $T_g$ values from 30 to 50° C. are useful in bonding components.

In an embodiment, the transient thermoplastic polymer adhesive can have a $T_{Donset}$ of about 80 to 325° C. In an aspect, the $T_{Donset}$ of the chemical composition of the transient thermoplastic polymer adhesive can be tuned to suit the application. The triggering temperature can be higher than the normal use temperature so that accidental triggering does not occur, but not so high that adhesive transient temperature is burdensome or destructive to other components. In an embodiment, the transient thermoplastic polymer adhesive can have both a $T_g$ of 10 to 80° C. and a $T_{Donset}$ of about 80 to 325° C. In an aspect, the $T_{Donset}$ values of about 80 to 180° C. are useful for epoxy-based components because the epoxy is stable within this range.

In an aspect, the transient thermoplastic polymer adhesive can include a catalyst or be exposed to a catalyst to initiate the transience of the adhesive. In an aspect, the $T_{Donset(cat)}$ of the chemical composition of the transient thermoplastic polymer adhesive can be tuned to suit the application considering the catalyst employed. In an embodiment, the transient polymer adhesive can have a $T_{Donset(cat)}$ of about 25 to 200° C. The catalyst can be a strong acid catalyst or a strong base catalyst. In an embodiment, the catalyst can be a strong acid (e.g., HCl, $H_2SO_4$, sulfonic acids, fluorinated acids) or strong bases (e.g., guanidines, phosphazenes, alkali hydroxides) where the transient polymer adhesive acts as a base and is destabilized by the acid catalyst. The catalyst can be strong Bronsted acids/bases (as given above) or Lewis acids/bases such as metal halides and boro halides. The acid or base can be released directly onto the transient thermoplastic polymer adhesive or generated thermally or photolytically by incorporating thermal or photo acid or base generators into the transient thermoplastic polymer adhesive. A photo acid generator is a compound which when exposed to the appropriate wavelength electromagnetic radiation, reacts, and produces an acid. A photo base generator is a compound which when exposed to the appropriate wavelength electromagnetic radiation, reacts and produces a base. A thermal acid or base generator requires only thermal activation to produce an acid or base, respectively.

In an embodiment, the adhesive property of the transient thermoplastic polymer adhesive can be recognized by measuring the adhesive force in a pull-test. A pull-test is performed by applying the adhesive to a component, such as strip of flexible plastic or metal and then measuring the force to pull the strip off a substrate. The strip is usually pulled in a direction normal to the rigid substrate so that the results can be quantified. The force to pull the strip off the substrate is reported as force per strip width. Typical units may be Newtons (N) per millimeter (mm). In an embodiment, the transient thermoplastic polymer adhesive can have an adhesive strength of about 0.02 to 2.0 N/mm or about 0.04 to 0.30 N/mm. The adhesive properties can also be recognized by the material being sticky or tacky. Additional details are provided in the Examples.

In an embodiment, the transient thermoset polymer adhesive can be represented by the following structures:

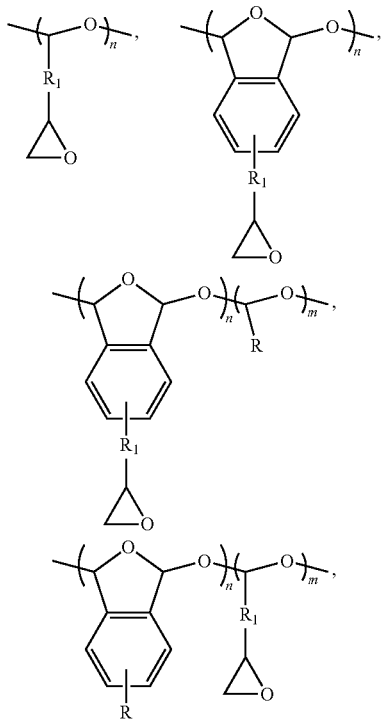

-continued

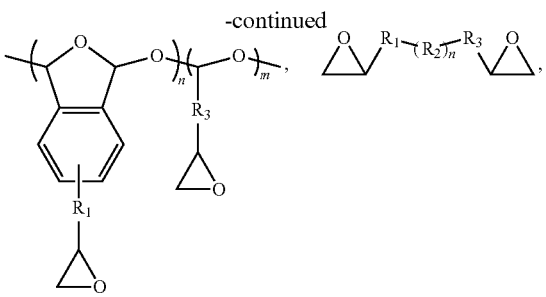

subscript "n" is 2 to 100,000 and subscript "m" is 2 to 100,000. In an embodiment, $R_2$ is a decomposable polymer. In an aspect, the decomposable polymer is a polymer that breaks down into small molecules upon activation by a trigger (e.g., electrical, optical, chemical, thermal or acoustic). After a suitable time frame (e.g., minutes to hours to days based on the application), depending upon the specific formulation of the transient polymer adhesive. The small molecule products can include the monomer from which the decomposable polymer was synthesized from or can be other chemical byproducts. In an embodiment, the decomposable polymer can include a poly(aldehyde) containing material, a carbonate containing material, a hydroxyalkanoate containing material, a sulfone containing material, a carbamate containing material, or co-polymers thereof. In an embodiment, the decomposable polymer can be:

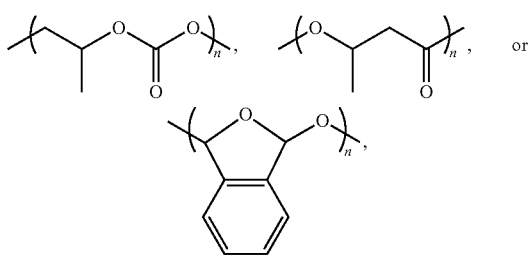

where n is 2 to 100,000. The transient thermoset polymer adhesives can be synthesized from monomer containing epoxy or functional groups (e.g., alkene, halide or alcohol) that can be reacted to an epoxy post-polymerization.

In an embodiment, $R_1$ and $R_3$ are each independently selected from $C_xX_y$, linear or branched, where X is H or a halogen and n is 1 to 12, a bivalent aryl group, a bivalent ether, a bivalent ketone, a bivalent carbonate, a bivalent amine, a bivalent amide, or a bivalent thiol, wherein bivalent is used to denote two bonds from the group so that the valency of the atoms are maintained. In an aspect, R can be an alkyl group, an aryl group, an ether group, a ketone group, a carbonate group, an amine group, an amide group, or a thiol group.

A bond to the center of a ring system means that group can be attached to any one of the carbon atoms. Also, the bond to the center of a ring system can mean one or more of those groups can be present, and if more than one, each group is bonded to a different carbon atom.

In an embodiment, the transient thermoset polymer adhesive can have a $T_g$ of about 0 to about 400° C. In an embodiment, the transient thermoset polymer adhesive can a $T_{Donset}$ of about 0 to about 450° C. In an embodiment, the transient thermoset polymer adhesive can have both a $T_g$ of 0 to about 400° C. and a $T_{Donset}$ of about 0 to about 450° C.

In an aspect, the transient thermoset polymer adhesive can include a catalyst or be exposed to a catalyst. In an embodiment, the transient polymer adhesive can have a $T_{Donset(cat)}$ of about 25 to 200° C. The catalyst is a strong acid catalyst or a strong base catalyst. In an embodiment, the catalyst can be a strong acid (e.g., HCl, $H_2SO_4$, sulfonic acids, fluorinated acids) or strong bases (e.g., guanidines, phosphazenes, alkali hydroxides). The catalyst can be strong Bronsted acids/bases (as given above) or Lewis acids/bases such as metal halides and boro halides. The acid or base can be released directly onto the transient thermoset polymer adhesive or generated thermally or photolytically by incorporating thermal or photo acid or base generators into the transient thermoset polymer adhesive.

In an embodiment, the transient thermoset polymer adhesive can have an adhesive strength of about 0.02 to 200 or about 0.05 to 25 N/mm.

In an embodiment, the transient polymer adhesives (e.g., thermoset or thermoplastic) can be electrically conducting or electrically non-conducting. Electrically conducting transient polymer adhesives can be made by adding electrical conducting particles, such as metal, to non-conducting transient polymer adhesives. The density of the electrical conductors is such that particle-to-particle contact allows electrical conduction from one edge of the transient polymer adhesives to the other. In an embodiment, the metal particles can be selected so that they are small and not visible to the eye.

As mentioned above, transformation of the adhesive from the solid to vapor state can be carried out by an electrical, chemical, thermal, optical process, and or acoustic process, which can be triggered by an electrical, optical, chemical, thermal or acoustic trigger. In an aspect, the triggering sequence can be a series of events, such as an optical trigger causing a chemical reaction where the chemical reaction creates a catalyst for polymer decomposition. An example of such a sequence is the absorption of light (i.e., light is the trigger) by a chemical which results in the creation of an acid. The acid then catalyzes the decomposition and vaporization of the adhesive. The acid-catalyzed decomposition can occur at ambient temperature, in solution, or at an elevated temperature, depending on the adhesive, the catalyst and the application.

A trigger such as an acoustic, electrical, optical, thermal and/or chemical event can be used to start the process by which the transient polymer adhesive transforms into volatile, small molecules (e.g., monomers and the like). The trigger is a way of exciting the transient polymer adhesive so as to initiate the transition from adhesive-to-nonadhesive state. The transformation can take minutes, to hours, to days depending upon the formulation and the desired outcome.

In an aspect, the acoustic trigger and process can include direct absorption of acoustic energy by the transient polymer adhesive or absorption of acoustic energy by a secondary component which creates a species which initiates the transformation of the transient adhesive.

In an aspect, the electrical trigger and process can include direct absorption of electrical energy by the transient polymer adhesive or absorption of electrical energy by a secondary component, such as a spark or heat-generating device, which creates a species which initiates the transformation of the transient adhesive.

In an aspect, the optical trigger and process can include direct absorption of optical energy by the transient polymer adhesive or absorption of electrical energy by a secondary component, such as a photo acid generator or photo base generator, which creates a species which initiates the transformation of the transient adhesive.

In an aspect, the thermal trigger and process can include direct absorption of thermal energy by the transient polymer adhesive or absorption of thermal energy by a secondary component, such as a thermal acid generator, which creates a species which initiates the transformation of the transient adhesive.

In an aspect, the chemical trigger and process can include direct absorption of chemical energy by the transient polymer adhesive or absorption of chemical energy by a secondary component which creates a species which initiates the transformation of the transient adhesive.

The structures that can be adhered together using embodiments of the transient polymer adhesive can include devices and textiles. In general, the devices can include metal, plastic, leather, ceramic, and glass that are bonded to devices such as sensors, printed wiring boards, energy sources, and silicon chips. In general, the transient polymer adhesive can be used to bond textiles together or components of the textiles together or to bond textiles to other structures. The textiles can include fibers and yarns made of natural and synthetic materials.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

Example

1) Thermoplastic Type (pDHTN, pDHCH, p(DHTN-Co-DHCH)

An example of a transient thermoplastic polymer adhesive is poly(dihydroxy-tetralin) formal (pDHTN). The pDHTN had a number average molecular weight of 13500 g/mole, and a $T_g$ around 77° C. The polymer was synthesized from a step-growth polymerization with dibromomethane and dihydroxy-tetralin with potassium hydroxide as a base.

The pDHTN is a solid at room temperature. It was dissolved into an appropriate solvent at 20 wt % polymer, drop-casted onto a silicon wafer, soft baked for an amount of time to remove the solvent, and then hot pressed at 120° C. and 300 kPa. A standard pull test was performed on the aluminum bonded to the silicon. The average force per width required to debond the aluminum (adhesive strength) was 0.06 N/mm. The pDHTN adhesive properties likely rely on physical attractions, like hydrogen bonding and dipole-dipole interactions.

In this example, the pDHTN onset of decomposition temperature is 322° C., making it well suited for higher temperature applications. With the aid of an acid catalyst the onset of decomposition temperature was 50° C. The use of an acid catalyst can cleave the polymer backbone and cause elimination reactions to form major products of naphthalene (volatile solid), formaldehyde (gas), and water (liquid or gas).

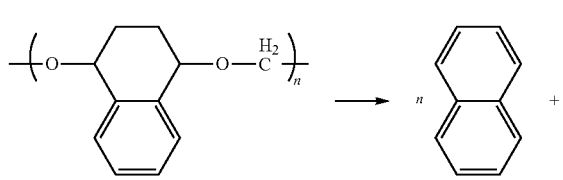

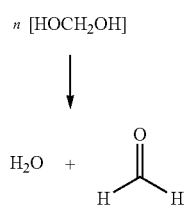

2) Thermoset Adhesive (Epoxy-PPC)

An example of a thermoset transient adhesive polymer was made from polypropylene carbonate (PPC). The PPC had a molecular weight of 2,000 g/mole and a glass transition temperature (Tg) of 15° C. The hydroxyl ends of PPC were reacted with allyl chloroformate in tetrahydrofuran (THF) using pyridine as a catalyst. This terminated the PPC with an allyl functionality. The allyl ends of the PPC were chemically transformed into epoxide rings by reacting the allyl ends of the PPC with MCPBA (meta chloro peroxi benzoic acid) in dichloromethane (DCM) for 24 hours. The new material is called epoxy-PPC.

The epoxy-PPC material is a viscoelastic liquid that was drop-casted directly onto a silicon wafer and subsequently bonded to aluminum foil using the epoxy-PPC transient polymer adhesive. A standard pull test was performed on the aluminum bonded to the silicon. The average force per width of the aluminum strip to debond the aluminum after thermally curing the epoxy-PPC was 0.27 N/mm adhesive strength. The epoxy-terminated PPC provides excellent adhesion by forming chemical bonds with the two surfaces. Other transient polymer adhesives form physical interactions, such as hydrogen-bonds. Epoxy-PPC can also be bonded to the surface of parts at low-temperature by mixing it with a hardener, such as a diamine. The diamine activates the epoxy rings at a lower temperature than the thermally activated event described above. This is particularly valuable for bonding temperature-sensitive components.

The terminated epoxy ends improved the adhesive properties of the PPC. The PPC backbone can be replaced with other decomposable polymers stated in the above. In this example, the PPC backbone can be initiated to decompose through chemical (acid or base) or thermal pathways. It is known that PPC can undergo backbone by cleavage of the chain ends. The thermal stability of the cured, epoxy-PPC was evaluated in the thermal gravimetric analysis (TGA). The onset of decomposition temperature, $T_{Donset}$, was 150° C. The major products of decomposition of PPC are $CO_2$ (gas) acetone (liquid), and propylene carbonate (liquid). Photo acid/base generators can be added to lower $T_{Donset}$ to below 100° C. This is an example drawing of the epoxy-PPC decomposition.

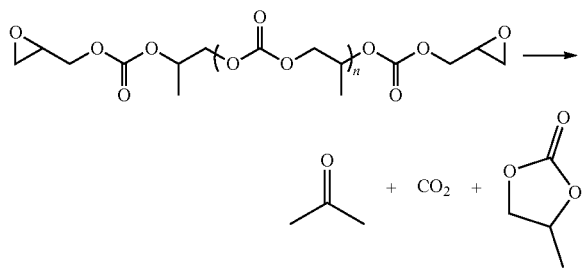

Procedure for Adhesion Testing:

1) Thermoplastic Type (pDHTN, pDHCH, p(DHTN-Co-DHCH))

Polymers solutions were dropcasted onto silicon strips and doctor bladed for thickness uniformity. The strips were baked to remove the solvent. Once the resulting polymer film had cooled, a piece of aluminum foil was placed on top and adhesive stack was pressed together between two hot metal plates. Different samples were exposed to a range of pressures between 100-600 kPa, and temperatures from the polymers $T_g$ to 70° C. above its $T_g$. The adhesive strength was measured according to ASTM D429 in an Instron, model 5842. The aluminum foil was pulled at a 90° angle from the silicon at a constant rate of 2±0.2 in./min. Adhesive strength was reported as the average force required to peel the foil up across the silicon strip, divided by the width of the silicon strip.

2) Thermoset Type (Epoxy-PPC)

Polymers solutions were drop-casted onto silicon strips and doctor bladed for thickness uniformity. A piece of aluminum foil was placed on top and adhesive stack was pressed with a pressure plate. The epoxy linkages were then cured at 100° C. for 1 hour on a hotplate. The adhesive strength was measured according to ASTM D429 in an Instron, model 5842. The aluminum foil was pulled at a 90° angle from the silicon at a constant rate of 2±0.2 in./min. Adhesive strength was reported as the average force required to peel the foil up across the silicon strip, divided by the width of the silicon strip.

Procedure for Determining Glass Transition Temperature $(T_g)$:

Differential scanning calorimetry (DSC) was used to measure the $T_g$ of the polymers. A small amount (5-10 mg) of dried polymer was pressed inside an aluminum pan and placed into the DSC with a temperature scan rate of 5° C./min.

Procedure for Determining Decomposition Temperature $(T_{Dnonset}$ and $T_{Dnonset(cat)})$:

Thermogravimetric analyzer (TGA) was used to measure the decomposition profiles of the polymers. Dried polymer (5-20 mg) was placed on a platinum pan in the TGA, and exposed to a temperature ramp rate of 1° C./min. The onset of the decomposition was taken as the temperature where slope first changed on a plot of mass remaining vs. temperature. The same procedure can be followed when a catalyst is present $(T_{Dnonset(cat)})$.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In an embodiment, "about" as used in conjunction with zero (0) means that values plus or minus zero (0) are included (e.g., −0.9, −1, 0.5, 1, etc.). In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A structure, comprising: a device or a textile adhered to a substrate using a transient polymer adhesive, wherein the transient polymer adhesive is selected from a transient thermoplastic polymer adhesive or a transient thermoset polymer adhesive, wherein the transient polymer adhesive loses its adhesive properties upon exposure to temperatures from about 0 to about 325° C., and wherein the transient polymer adhesive has an adhesive strength of about 0.02 to 200 N/mm.

2. The structure of claim 1, wherein the transient polymer adhesive loses its adhesive properties upon exposure to temperatures from about 80 to about 325° C.

3. The structure of claim 1, wherein the transient polymer adhesive loses its adhesive properties upon exposure to temperatures from about 25 to about 200° C.

4. The structure of claim 1, wherein the device is an electronic device.

5. The structure of claim 4, wherein the electronic device selected from the group consisting of a sensor, printed wiring board, energy source, and silicon chip.

6. The structure of claim 1, wherein the textile is made of fibers, yarns, or a combination thereof.

7. The structure of claim 1, wherein the transient polymer adhesive has an adhesive strength of about 0.05 to 25 N/mm.

8. The structure of claim 1, wherein the transient polymer adhesive has an adhesive strength of about 0.04 to 0.30 N/mm.

9. The structure of claim 1, wherein the transient polymer adhesive has a $T_g$ of about 10 to about 80° C.

10. The structure of claim 1, wherein the transient polymer adhesive has a $T_g$ of about 30 to about 50° C.

11. The structure of claim 1, wherein the transient polymer adhesive has a $T_{Donset}$ of about 80 to about 325° C.

12. The structure of claim 1, wherein the transient polymer adhesive has a $T_{Donset}$ of about 80 to about 180° C.

13. The structure of claim 1, wherein the transient polymer adhesive further comprising a catalyst and has a $T_{Donset(cat)}$ of about 25 to about 250° C.

14. The structure of claim 1, wherein the thermoset polymer has one of the following structures:

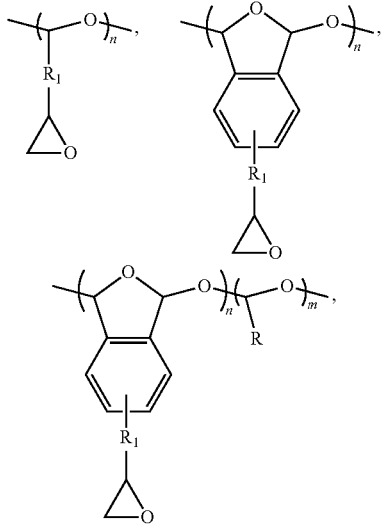

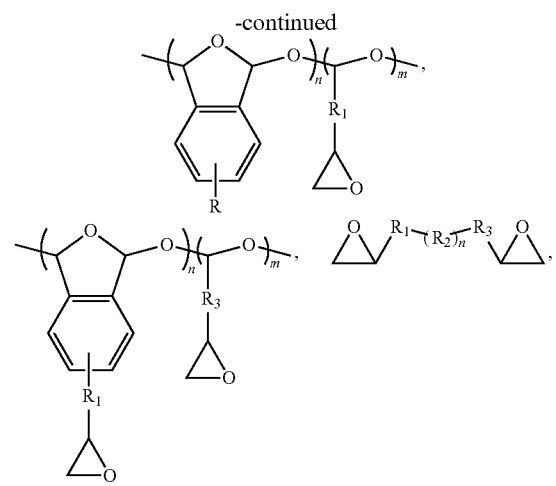

wherein $R_2$ is a decomposable polymer, wherein $R_1$ and $R_3$ are each independently selected from $C_xX_y$, linear or branched, where X is H or a halogen and x is 1 to 12 and y is x to 2x, a bivalent aryl group, a bivalent ether, a bivalent ketone, a bivalent carbonate, a bivalent amine, a bivalent amide, or a bivalent thiol, wherein R is a alkyl group, an aryl group, an ether group, a ketone group, a carbonate group, an amine group, an amide group, or a thiol group, wherein n is 2 to 100,000 and m is 2 to 100,000.

15. The structure of claim 14, wherein the decomposable polymer is selected from an aldehyde monomer group, a carbonate group, a hydroxyalkanoate group, a sulfone group, or a carbamate group.

16. The structure of claim 14, wherein the decomposable polymer is selected from the group consisting of:

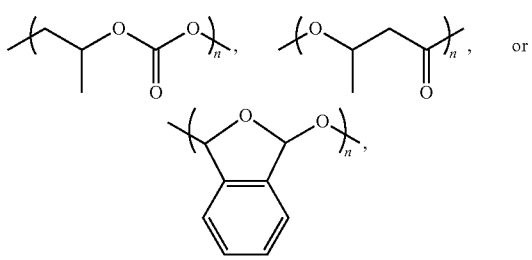

wherein n is 2 to 100,000.

17. The structure of claim 1, wherein the thermoplastic is represented by the following structure:

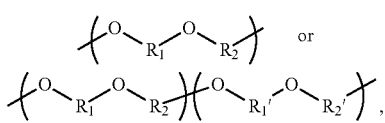

wherein $R_1$ and $R_{1'}$ are each independently selected from $C_xX_y$, linear or branched, where X is H or a halogen and x is 1 to 12 and y is x to 2x, and wherein $R_2$ and $R_{2'}$ are each independently selected from an unsaturated cycloalkyl, wherein $R_1$ and $R_{1'}$ are the same or different and wherein $R_2$ and $R_{2'}$ are the same or different.

18. The structure of claim 17, wherein $R_2$ and $R_{2'}$ are each independently selected from selected from

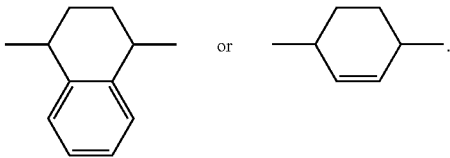
or .

19. The structure of claim 1, wherein the thermoset polymer has one of the following structures wherein

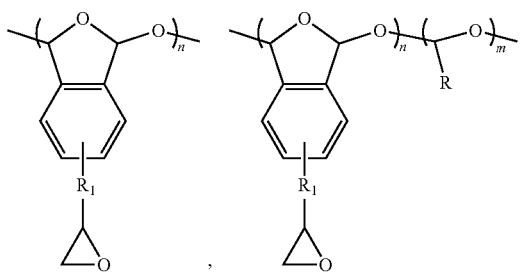
, or

-continued

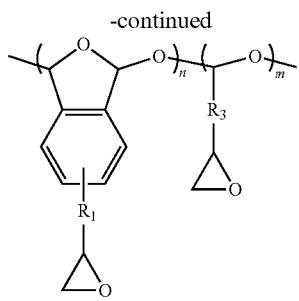
, $R_1$ and $R_3$ are each independently selected from $C_xX_y$, linear or branched, where X is H or a halogen and x is 1 to 12 and y is x to 2x, a bivalent aryl group, a bivalent ether, a bivalent ketone, a bivalent carbonate, a bivalent amine, a bivalent amide, or a bivalent thiol, wherein R is a alkyl group, an aryl group, an ether group, a ketone group, a carbonate group, an amine group, an amide group, or a thiol group, wherein n is 2 to 100,000 and m is 2 to 100,000.

* * * * *